(No Model.) 2 Sheets—Sheet 1.

J. TAMS.
MEANS FOR REGULATING THE CONTAINING CAPACITY OF DRINKING VESSELS, &c.

No. 289,467. Patented Dec. 4, 1883.

(No Model.) 2 Sheets—Sheet 2.

J. TAMS.
MEANS FOR REGULATING THE CONTAINING CAPACITY OF DRINKING VESSELS, &c.

No. 289,467. Patented Dec. 4, 1883.

Witnesses:
F. M. Burnham
George Tilghman

Inventor:
John Tams
by W. H. Babcock
Att'y.

United States Patent Office.

JOHN TAMS, OF LONGTON, COUNTY OF STAFFORD, ENGLAND.

MEANS FOR REGULATING THE CONTAINING CAPACITY OF DRINKING-VESSELS, &c.

SPECIFICATION forming part of Letters Patent No. 289,467, dated December 4, 1883.

Application filed July 24, 1883. (No model.) Patented in England March 31, 1882, No. 1,564.

*To all whom it may concern:*

Be it known that I, JOHN TAMS, a subject of the Queen of Great Britain, residing at Longton, Staffordshire, England, have invented a certain new and useful Process of Constructing Vessels for Containing a Given Quantity of Liquid; and I do hereby declare the following to be a full, clear, and exact description of the invention, reference being had to the accompanying drawings, which form part of this specification, in which similar letters of reference indicate corresponding parts, and in which—

Figure 1:
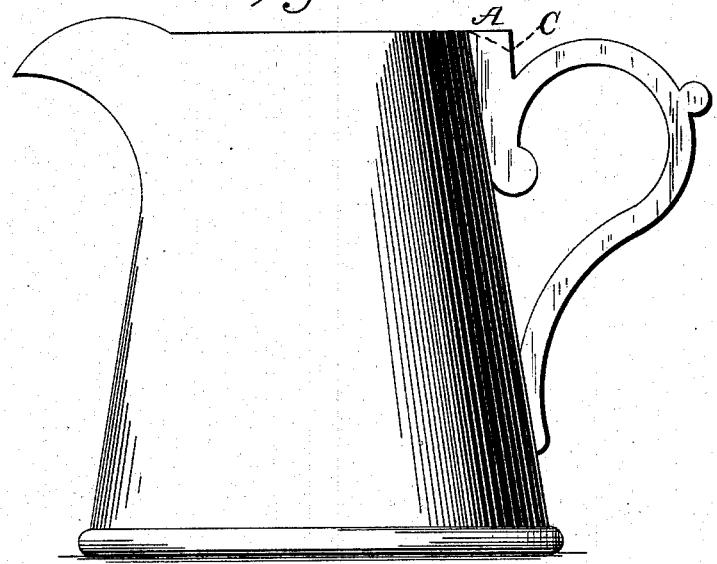
Figure 2:
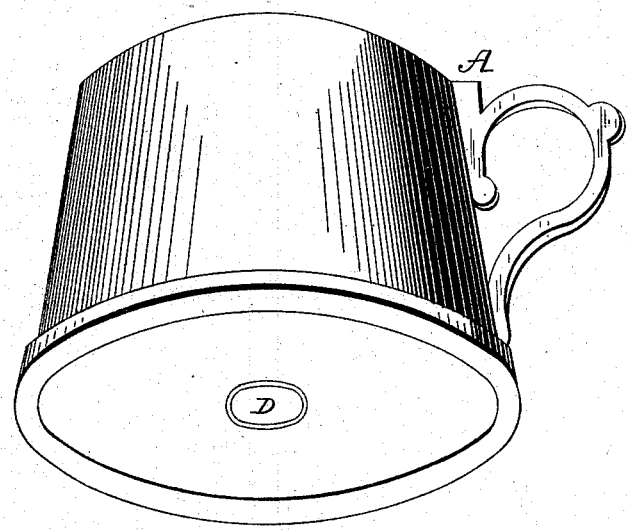
Figure 3:
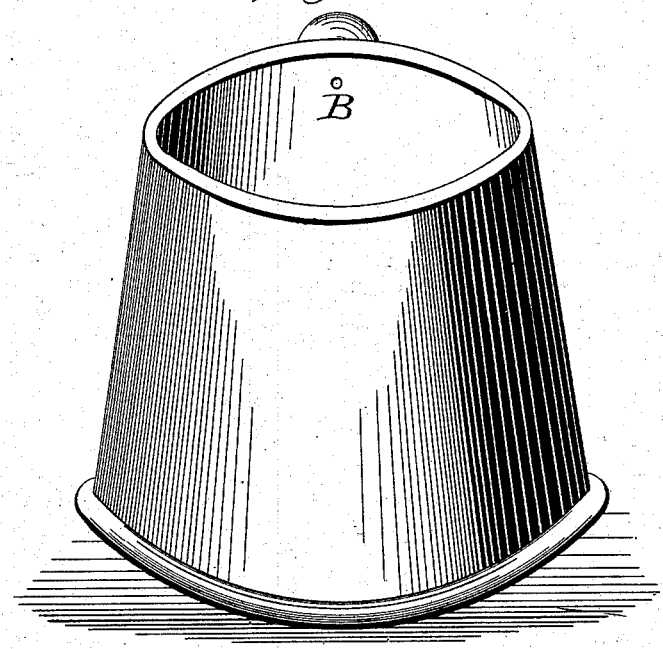
Figure 4:
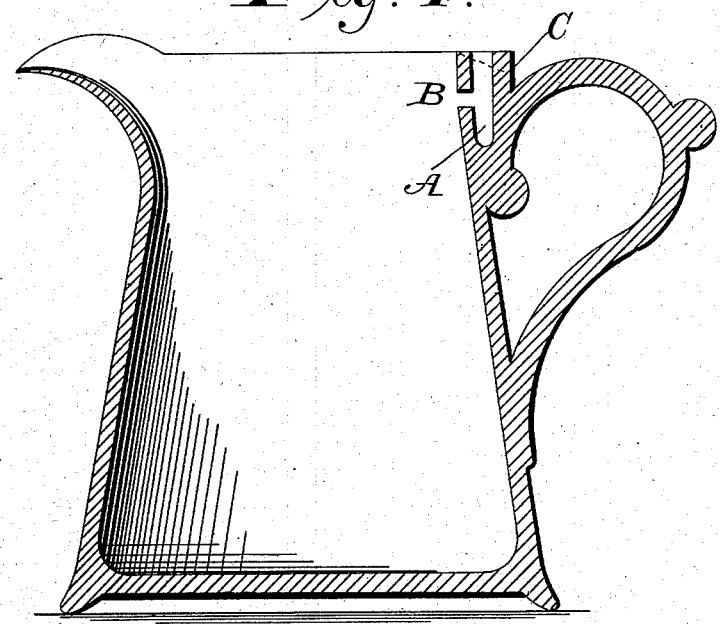

Figure 1 shows a view in external elevation, Figs. 2 and 3 views in perspective, and Fig. 4 a view in sectional elevation, of a drinking-measure with my improvements applied thereto.

To regulate the containing-capacity of the measure, I form a recess, A, Figs. 1, 2, 4, preferably tubular, either just above or in the upper part of the handle. This recess communicates by means of an aperture, B, Figs. 3, 4, with the interior, so that when the vessel is filled with liquid it flows into the recess through the aperture. The recess, as shown, extends a convenient height above the handle—say about three-fourths of an inch—so that if the vessel is over measure when fired, I grind or cut down the walls of the recess, either in the clay, biscuit, or glost state, to a sufficient degree, as indicated by the dotted line *c*, Figs. 1, 4, and so reduce the containing-capacity of the vessel to the exact measure required without in any way defacing or damaging the vessel itself. Thus, supposing the vessel to be one-eighth of an inch over measure, I reduce the height of the walls of the recess one-eighth of an inch, and by this means exact measure can be guaranteed, as when the vessel is too full the liquid will overflow from the tubular recess when so cut down. Such recess may also be formed in or on any other convenient part of the vessel other than the handle.

Having thus particularly described my invention and the manner of carrying the same into effect, I claim as novel and of my invention—

The method of constructing vessels for containing a given quantity of liquid, consisting in the following steps: first, forming a vessel of plastic material with a recess in or on the wall thereof, said recess extending above the point where it communicates with the interior of said vessel; and, secondly, removing the upper part of the outer wall of said recess while still in a plastic or incomplete condition until the line of overflow is lowered to such a point that the vessel will not hold more than the required amount.

In testimony whereof I affix my signature in presence of two witnesses.

JOHN TAMS.

Witnesses:
W. A. COWLESHAW,
JNO. W. MALLETT,
*Clerks to Messrs. Paddock & Sons, Solicitors, Hanley.*